No. 818,686. PATENTED APR. 24, 1906.
A. C. GRISCOM.
MEANS FOR AUTOMATICALLY CONTROLLING THE OPERATION OF BEER
OR OTHER PUMPS AND SIMILAR DEVICES.
APPLICATION FILED JULY 6, 1905.
2 SHEETS—SHEET 2.
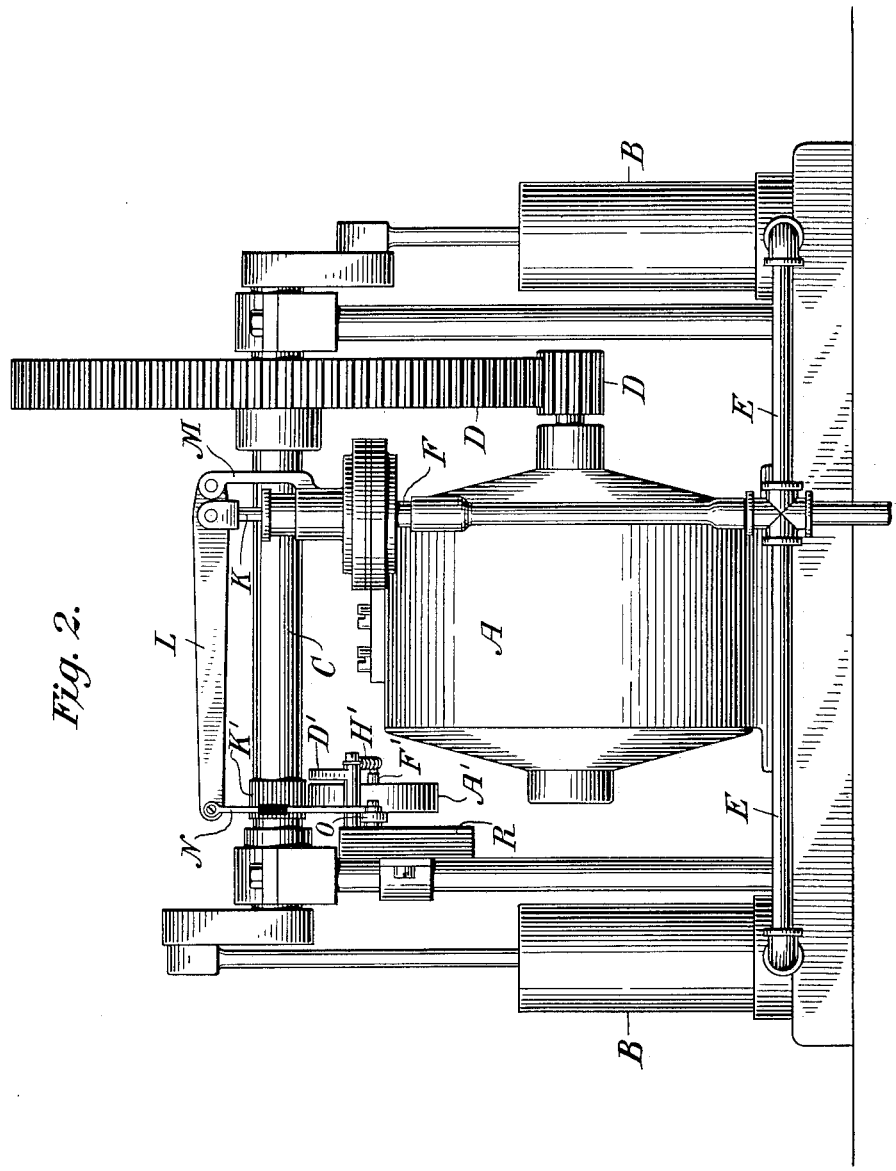
WITNESSES:
INVENTOR
Alfred C. Griscom
By his Attorneys

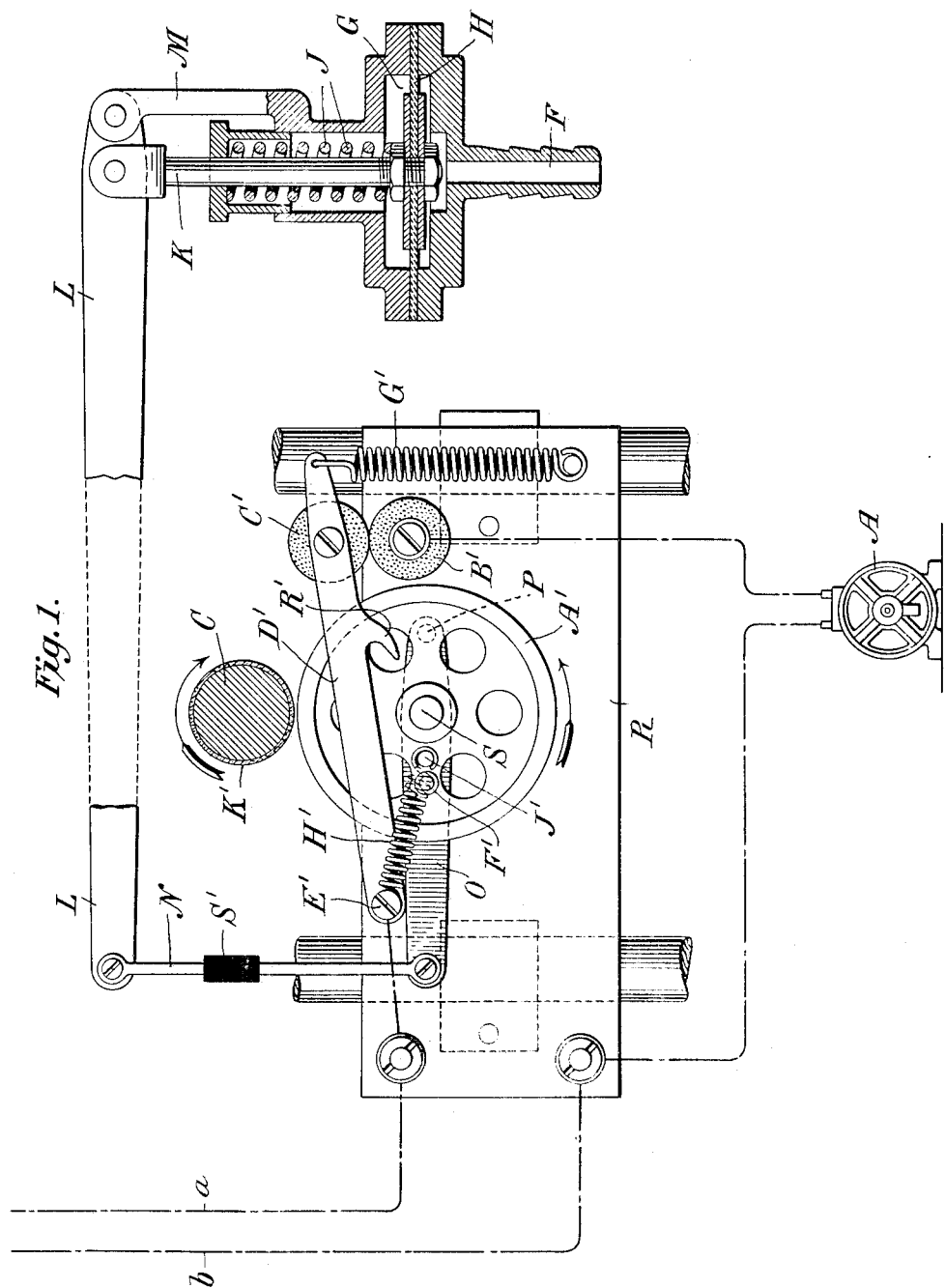

UNITED STATES PATENT OFFICE.

ALFRED C. GRISCOM, OF NEWARK, NEW JERSEY, ASSIGNOR TO THE GRISCOM LEHING MANUFACTURING COMPANY, OF NEW YORK, N. Y., A PARTNERSHIP.

MEANS FOR AUTOMATICALLY CONTROLLING THE OPERATION OF BEER OR OTHER PUMPS AND SIMILAR DEVICES.

No. 818,686.  Specification of Letters Patent.  Patented April 24, 1906.

Application filed July 6, 1905. Serial No. 268,587.

*To all whom it may concern:*

Be it known that I, ALFRED C. GRISCOM, a citizen of the United States, residing at Newark, in the State of New Jersey, have invented a new and useful Means for Automatically Controlling the Operation of Beer or other Pumps and Similar Devices, of which the following is a specification.

This invention relates to means for automatically controlling the operation of beer or other pumps and similar devices.

The object of the invention is to provide means which are simple in construction and efficient in operation for automatically controlling the operation of beer-pumps and similar devices.

A further object of the invention is to provide means operated automatically by the action of the pump for controlling the motor through which the pump is operated.

In a more limited sphere of use of my invention the object is to provide a simple, efficient, and inexpensive automatic switch for electric pumps.

Other objects of the invention will appear more fully hereinafter,

The invention consists, substantially, in the construction, combination, location, and relative arrangement of parts, all as will be more fully hereinafter set forth, as shown in the accompanying drawings, and finally pointed out in the appended claims.

Referring to the accompanying drawings, and to the various views and reference-signs appearing thereon, Figure 1 is a view, parts in elevation, parts broken off, and parts in section, of a mechanism embodying the principles of my invention. Fig. 2 is a view in elevation, showing the mode of application of a construction embodying my invention to the operation of a beer-pump.

In practical operation it is customary to employ air-pumps for pumping air into tanks, reservoirs, or the like containing beer or similar beverages or liquids in order to deliver such beverage or liquid from the reservoir or tank in the basement, for instance, of a store or other place of business to an upper floor or other point for service to patrons. In the use of such apparatus it is particularly desirable to employ means whereby the motor which operates the pump may be so controlled that it will be put into operation automatically when the air-pressure in the tank or reservoir falls below a predetermined point and to automatically arrest the motor when the pressure of the air in the tank or reservoir attains a desired degree.

It is among the special objects and purposes of my present invention to provide a simple and efficient controlling apparatus which accomplishes these results, and in carrying out my invention I propose to employ, in one form of application thereof, an electric motor for operating the pump and to control the circuits of the motor by separable contacts, the separation of such contacts being effected by mechanism controlled by the air-pressure produced by the pump, whereby variations in such pressure control the pump-actuating motor.

Referring to the accompanying drawings, reference-sign A designates a motor which may be of any suitable or desirable type or construction, and B B the pumps operated therefrom. In the particular form shown, to which, however, my invention is not to be limited or restricted, I employ an electric motor, and I actuate the pistons therefrom through any suitable or convenient arrangement of gearing—as, for instance, cranks on the crank-shaft C—the latter being driven from the motor through suitable gears D.

Reference-sign E designates the air-delivery pipe from the pumps to the tank or reservoir. At any suitable or convenient point in this pipe is a pipe connection F, leading and delivering to a chamber G, in which is arranged a diaphragm H, adapted to be acted upon by the air-pressure produced by the operation of the pump. The movement of the diaphragm under the influence of the air-pressure is opposed by a spring J, arranged to exert its tension on the opposite side of the diaphragm. Connected to the diaphragm is a rod or stem K, so as to move therewith, said rod or stem being pivotally connected to a lever L, which is pivotally supported at one end to a bracket M or other convenient support. At its other or free end lever L is connected, by means of a link N, to the free end of a second lever O, the latter being pivotally mounted at its other end, as at P, upon a slate or tablet R, of insulating material, suitably supported upon the framework of the apparatus. Intermediate its ends the lever O carries a pin or stud S, upon which is journaled a wheel A'. The contacts B' C' are arranged in the circuit of the motor A. These contacts may be of any suitable construction and material, such as is ordinarily employed in electric circuits. In practice I prefer to employ carbon contacts. The contact B' is fixed upon the insulating-slate R, while the coöperating contact C' is carried on a lever D', pivotally mounted, as at E', upon the slate R on the opposite side of wheel A' from the contact C'. A roller F' is mounted eccentrically upon the face of wheel A', so that when said wheel is rotated said roller will engage the under side or edge of lever D' and rock the same, thereby carrying the contact C' out of contact with its coöperating contact B', and hence breaking the circuit of motor A. The rocking or swinging movement of lever D' is yieldingly opposed in any convenient manner—as, for instance, by means of spring G', the tension of which is constantly exerted upon said lever to hold the same in position for the contact C' to make contact with its coöperating contact B', and hence to close the motor-circuit. A spring H' is connected at one end to the slate R and at the other end, as at J', to a stud or pin eccentrically mounted upon the side or face of the wheel A', the tension of said spring being exerted to normally hold said wheel in an initial position with reference to its rotative movement. The wheel A' is so positioned with reference to the pump-actuating crank-shaft C that when the supporting-lever O, carrying said wheel, is rocked or swung by the actuation of the diaphragm H the periphery of said wheel is brought into frictional contact with said shaft, whereby said wheel is rotated. If desired, and in order to increase the frictional driving effort of the crank-shaft C upon the wheel A', said shaft may be provided with a band or ring K', of leather or other suitable material, at the point where the wheel A' contacts therewith.

The operation of the device will now be described, assuming the parts to be in the positions shown in Fig. 1 and the pumps to be in operation being actuated by the motor and the pump-actuating crank-shaft rotating in the direction of the arrow. Now should the pressure developed by the operation of the pumps become excessive or greater than required the diaphragm H will be operated against the action of spring J, and hence lever L will be rocked, thereby rocking lever O through the link connection N, and hence elevating or raising wheel A' into peripheral contact with the crank-shaft C, whereby said wheel is driven or rotated in the direction indicated by the arrow and against the tension of spring H' until the roller F' is brought into engagement with the under side or edge of lever D', whereby said lever is rocked against the tension of spring G' and in a direction to carry the contact C' out of contacting relation with respect to its coöperating contact B', thereby breaking the motor-circuit, and hence arresting the motor and also the pump. As soon as the motor stops, the rotation of wheel A' also stops, since said wheel is driven from and by the motor. After the spring H' has passed the dead-center line of pull thereof, due to its eccentrically-positioned point of connection to the wheel, the tension of said spring is exerted in a direction to cause said wheel A to continue its rotative movement which had been initiated by its peripheral contact with crank-shaft C, and consequently the return of said wheel to initial position is insured when said wheel A' is moved out of contact with shaft C. It will also be observed that during this part of the operation of the device the tension of spring H' is acting in opposition to that of spring G', and hence the tension of spring G' is in a measure counterbalanced. The effect of thus counterbalancing the tension of spring G' is to reduce the amount of work required to be performed by wheel A' in rocking lever D' to effect a separation of contacts B' C'. It will also be seen that the power required to rotate wheel A' is supplied directly from the motor, thereby relieving the diaphragm of the necessity of performing this work, all the diaphragm is required to do being merely to bring the wheel A' into driving relation with respect to the pump-actuating crank-shaft. This I regard as an important and valuable feature of my invention and enables me to produce a device of the character set forth which is exceedingly simple and efficient for the purposes intended, the drawing in Fig. 1 illustrating in full size a construction which I have found very effective in practical operation. When the motor-circuits are broken and the motor is stopped, as above explained, the further rotative movement of wheel A' is arrested, said wheel remaining in peripheral contact with the shaft C until the pressure on the diaphragm falls to the proper limit by consumption of the air-pressure in the tank or reservoir or from other cause, whereupon the tension of spring J is exerted to again return or restore the diaphragm to its normal position, thereby rocking lever L, and hence depressing lever O, to carry wheel A' out of contact with the crank-shaft C. The tension of spring H' is then exerted to return or restore wheel A' to its initial position, thereby permitting the contacts B' C' to again make contact with each other, and hence reëstablishing the motor-circuit, whereupon the pumps are thrown into action again. It may sometimes happen that when the pumps are suddenly arrested at midstroke or otherwise, a back-pressure effect is produced, tending to reversely rotate the shaft C, and hence also the wheel A', thereby permitting the motor-circuits to be again completed when the operation of the motor and pumps is undesirable. To prevent this action, I may, if desired, provide the lever D' with a shoulder or detent (indicated at R') in position for the roller F' to snap thereover and which locks and holds the wheel A' against reverse rotation. The circuit-wires of the motor are indicated at a and b and may lead to opposite sides of the motor, one of said wires including the contacts B' C' in circuit therewith. In order to guard against short-circuits, an insulation (indicated at S') may be inserted in the link connection N.

The operation of the device will be readily understood from the foregoing description, taken in connection with the drawings, and is as follows, assuming in starting that the parts are in the relative positions shown in Fig. 1, with the contacts B' C' closed upon each other and the wheel A' out of peripheral contact with the shaft C: Now by starting up the motor the pumps are put into operation and air is thereby pumped into the reservoir for use. When the pressure in the reservoir exceeds the given or desired limit, the diaphragm H operates, thereby rocking lever L and through the link connection N also rocking lever O, thereby bringing wheel A' into peripheral contact with shaft C. This action places wheel A' in rotation, being impelled thereto through the frictional driving contact thereof peripherally with said shaft C. In the rotative movement of wheel A' the pin or stud F', carried upon the face thereof, is caused to be brought into engagement with the inner edge of lever D' or with the inner edge of the detent R' thereon, thereby rocking said lever in a direction to carry contact C' out of contact with contact B', and hence opening the motor-circuit and arresting the motor. Should the wheel A' continue its rotative movement through momentum a short distance beyond the point necessary to cause separation of the contacts B' C' and so as to carry the pin or stud F' beyond the detent R', still the lever D' will be held in sufficiently raised position to maintain said contacts B' C' separated, by reason of the fact that after passing the detent R' the pin or stud F' will engage the inner edge of the lever D', and the radial distance of pin or stud F' from the axis of rotation of wheel A' is sufficiently great, as clearly shown, to maintain the lever D' raised throughout a distance of travel of said pin or stud beyond the detent R' sufficient to take care of any momentum that may be developed and to insure the maintenance of the contacts B' C' in separation. In view of the frictional engagement of wheel A' with shaft C there is very little, if any, tendency of momentum to carry or to rotate said wheel A' beyond such position as will cause or enable or permit the contacts B' C' to close upon each other until the pressure in the reservoir has been diminished to the desired or required extent; but should for any cause such an exigency arise the wheel A' would only make one more rotation, which would do no harm, and then the contacts B' C' would be again separated and maintained in that relation by the pin or stud F' again engaging the inner edge of the lever D'. The motor-circuit thus remains opened until the pressure in the reservoir decreases sufficiently for the diaphragm H, through spring J, to rock lever L in the opposite direction, thereby rocking the wheel-supporting lever O in a direction to carry wheel A' out of peripheral contact with shaft C, and when this takes place the spring H' returns or restores wheel A' to its initial position, carrying the pin or stud F' away from the inner edge of lever D', and hence permitting the contact C' to again close upon contact B', thereby again completing the motor-circuit, whereupon the motor again starts up, thereby again actuating the pumps. The provision of the detent R' insures against any rebound through back pressure or otherwise after the pin or stud F' has passed beyond said detent.

While I have shown my invention as applied to the automatic operation and control of beer-pumps, it is obvious that the principles thereof are equally well adapted for general use. I do not desire, therefore, to be limited or restricted in respect to the use to which my invention is to be put. It is also obvious that many variations and changes in the details of construction and arrangement would readily suggest themselves to persons skilled in the art and still fall within the spirit and scope of my invention. I do not desire, therefore, to be limited or restricted to the exact details shown and described; but, Having now set forth the object and nature of my invention and a construction embodying the principles thereof and having described the purpose, function, and mode of operation thereof, what I claim as new and useful and of my own invention, and desire to secure by Letters Patent, is—

1. In an apparatus of the class described, a motor, a power mechanism operated thereby, a motor-circuit make-and-break device operated by the motor, and means controlled by the power mechanism for controlling the motor-circuit make and break device.

2. In an apparatus of the class described, a motor, a pump driven therefrom, a motor-circuit make-and-break device operated from said motor, and means controlled by the pump for controlling the motor-circuit make and break device.

3. In an apparatus of the class described, a power mechanism, gearing for driving the same including a shaft, a motor for operating said shaft, means arranged to be engaged with and disengaged from said shaft for opening and closing the circuit of said motor, and means controlled by said power mechanism for effecting automatically the engagement and disengagement of said shaft and motor-circuit opening and closing means.

4. In an apparatus of the class described, a pump, a motor for actuating the same, a switch for opening and closing the circuit of the motor, gearing actuated by the motor for operating said switch, and means controlled by the pump for controlling the engagement and disengagement of said switch with and from its operating-gearing.

5. In an apparatus of the class described, a pump, a motor for operating the same, a switch for making and breaking the motor-circuit, means driven by the motor for operating said switch, and means controlled by the pump for automatically rendering the switch-operating means operative or inoperative as desired.

6. In an apparatus of the class described, a pump, a delivery-pipe therefor, a motor for driving the pump, a switch to control the motor-circuits, means driven by the motor for operating the switch to open said circuit, and a pressure mechanism communicating with the pump delivery-pipe for controlling the connection of said switch-operating means with its driving power.

7. In an apparatus of the class described, a pump, a driving-motor therefor, a switch for making and breaking the motor-circuit, a wheel for operating said switch, means for driving said wheel from the motor, and a pressure device operated by variations in pressure produced by the pump for connecting and disconnecting said wheel from its driving means.

8. In an apparatus of the class described, a pump, a shaft for driving the same, a motor for rotating said shaft, a switch for controlling the motor, a wheel for operating the switch and a pressure-actuated device under the control of the pump for moving said wheel into and out of peripheral driving contact with said shaft.

9. In an apparatus of the class described, a pump, a shaft for driving the same, a motor for rotating said shaft, a switch for controlling the motor, a wheel for operating the switch, a movable support for the wheel whereby said wheel may be moved into and out of peripheral driving engagement with said shaft so as to be driven by the motor, and a pressure-actuated device, under the control of the pump for moving said support.

10. In an apparatus of the class described, a pump, a shaft for driving the same, a motor for rotating said shaft, a switch for controlling the motor, a wheel for operating the switch, a pressure device under control of the pump for moving the wheel into and out of peripheral driving contact with said shaft, and means for preventing reverse movement of said wheel.

11. In an apparatus of the class described, an automatic switch comprising separable contacts, a means for separating said contacts, including a rotatable wheel, a spring having eccentric connection with said wheel, means for rotatively moving said wheel against the action of said spring until the dead-center line of said connection is passed, whereby said spring tends to operate thereafter to rotatively move said wheel to initial position, and means operated by the rotative movement of the wheel under the influence of the driving mechanism therefor for separating said contacts.

12. In an apparatus of the class described, an automatic switch, including relatively fixed and movable contacts, means for yieldingly maintaining said contacts in contacting relation, and means for moving said movable contact against the action of said yielding means, and including a rotatable wheel and a spring having eccentric connection with said wheel.

13. In an automatic switch comprising separable contacts, a spring normally maintaining said contacts closed upon each other, a rotatable wheel for separating said contacts, and a spring eccentrically connected at one end to said wheel, said last-mentioned spring initially opposing the rotative movement of said wheel, but finally assisting the rotative movement of said wheel and counteracting the tension of the spring which maintains said contacts closed.

14. An automatic switch comprising separable contacts, a spring normally operating to maintain the said contacts in closed relation; a rotatable wheel for separating said contacts, a spring eccentrically connected at one end to said wheel, a power mechanism for rotating said wheel, and means for automatically controlling the engagement of said wheel with its power-driving mechanism.

15. In an apparatus of the class described, a motor, a shaft driven therefrom, a pump operated from said shaft, contacts arranged in the motor-circuit, a lever carrying one of said contacts, a pivotally-mounted lever carrying a stud, a wheel journaled upon said stud, a roller mounted upon said wheel and arranged when said wheel is rotated to engage said contacting-lever to separate said contacts, and a pressure device under the control of the pump for rocking said wheel-supporting lever to carry said wheel into and out of driving relation with respect to said shaft.

16. In an apparatus of the class described, a motor, a shaft driven therefrom, a pump actuated by said shaft, contacts arranged in the motor-circuit, a lever carrying one of said contacts, a spring connected to said lever and operating to maintain said contacts closed upon each other, a pivotally-mounted lever carrying a stud, a wheel journaled to rotate upon said stud and having a roller upon the face thereof arranged to engage the centact-carrying lever to separate said contacts, a spring having one end connected eccontrically to said wheel, a pressure device controlled by the pump, lever-and-link connections between said pressure device and said pivotally-mounted lever, whereby said wheel is automatically moved into and out of driving relation with respect to said shaft.

17. In an apparatus of the class described a motor, separable contacts controlling the circuit of said motor, a rotatable wheel having a pin or stud, means operated by said pin or stud for separating said contacts, means operated by the motor for rotating said wheel and a detent arranged to be engaged by said pin or stud for preventing reverse rotation of said wheel.

18. In an apparatus of the class described, a motor, separable contacts in the motor-circuit, a rotatable wheel having a pin or stud, a lever carrying one of said contacts and arranged to be engaged by said pin or stud to separate said contacts, means for rotating said wheel and means arranged to engage behind said pin or stud to prevent reverse rotation of said wheel.

19. The combination with a motor, an automatic switch for controlling said motor, including separable contacts, a lever carrying one of said contacts, said lever provided with a detent, a rotatable wheel having means to engage said lever to separate said contacts, said detent operating to prevent reverse rotation of said wheel, and means for automatically controlling the rotative movement of said wheel.

In witness whereof I have hereunto set my hand, this 3d day of July, 1905, in the presence of the subscribing witnesses.

ALFRED C. GRISCOM.

Witnesses:
EDW. H. MILLER,
S. E. DARBY.